Figure 1:
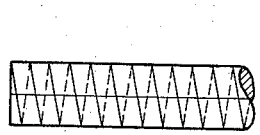
Figure 2:
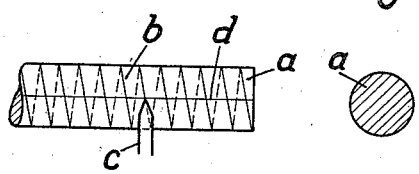

March 22, 1938.　　　H. LINDNER　　　2,111,977

SCALE FOR MEASURING LENGTHS

Filed Feb. 8, 1935

Inventor:
Herbert Lindner
By Frank S. Appleman
Attorney.

Patented Mar. 22, 1938

2,111,977

UNITED STATES PATENT OFFICE 2,111,977

SCALE FOR MEASURING LENGTHS

Herbert Lindner, Berlin, Germany

Application February 8, 1935, Serial No. 5,682
In Germany May 7, 1934

2 Claims. (Cl. 33—1)

This invention relates to scales for measuring lengths in any units such as metres or inches and has for its object to provide an improved scale of this character. In scales as at present constructed the graduation consists of a number of straight division lines parallel to each other, these lines being engraved in the case of metal or glass scales of greater accuracy, as utilized in machine tool construction. In order to produce division lines of this character the engraving tool is arranged to carry out a spacing stroke after every working or engraving stroke and the mechanism for operating the tool comprises a number of gear parts the slackness or lost motion of which unfavourably affects the sub-division of the scale. In general inaccuracies in the scale due to this cause are inappreciable for ordinary measuring purposes but when a greater accuracy is required and a microscope is employed for reading the scale as is usual for instance, in measuring and jig boring machines, these inaccuracies are serious.

The present invention has for its object to provide a simple and inexpensive scale for measuring lengths which shall meet the highest requirements as regards accuracy and according to the invention the graduations or scale divisions are arranged to take the form of a helical line on the periphery of a cylindrical body.

Scales of cylindrical form have been previously proposed but without the helical scale division of the invention, the scale division lines on the contrary being in planes perpendicular to the axis of the cylinder. In accordance with the invention the helical scale division line in the case of a metal or glass scale is, for example engraved or ruled by means of a diamond. The cylindrical body of the scale on the outer periphery of which the helical line is to be produced, is mounted between the centres of a lathe or grinder and the engraving tool is fed along at a speed relative to the revolving cylindrical scale corresponding to the desired pitch of the helix to be formed.

Apparatus embodying such a scale is illustrated and described in my co-pending application filed February 8, 1935 Serial No. 5,681 now issued as Patent No. 2,039,231 of April 28, 1936. In this application, it will be seen, that the cylindrical scale is rotatably mounted and that means are provided to measure equal parts of a complete rotation. Of the two elements, the scale and the index, one is fixed to a lineally movable member and the other is fixed to a stationary member. In measuring the displacement of the movable member relative to the fixed member, using for instance the microscopic index herein indicated at $m$, the scale is rotated until the scale line lies between the lines $m'$, $m'$ and the reading noted, it being understood that the pitch of the spiral line $b$ is equal to the smallest whole unit to be measured, for instance, one millimeter. The movable member is now moved and the number of lines crossed by the index is noted. If the index then straddles the spiral line, a definite number of millimeters is given by the spaces between the starting point and the final point of adjustment and nothing further is necessary. On the contrary, if the index is stopped between two convolutions, the scale is rotated until the spiral line is brought between the index lines and the arc of rotation in terms of a complete rotation is noted and added to the whole number of pitch spaces crossed by the index. For instance, if twenty-two spaces are crossed and the scale must be rotated $\frac{3}{10}$ of a full revolution, the reading would be 22.3 mm.

The feed of the tool is effected by a very accurate lead screw, which is hardened, ground and lapped and being also in certain cases provided with a correcting arrangement. It will be evident that the production of a scale in accordance with the invention is considerably cheaper and simpler than that of the scales hitherto used having straight division lines. A helical line of extreme fineness can be formed on the cylindrical body and owing to the constant engagement of the tool with the greatest uniformity, so that a precise reading of the scale can be effected by means of an optical device.

The invention is illustrated diagrammatically by way of example in Figures 1 to 4 of the drawing. On the outer surface of the cylindrical body $a$, which may be of solid or hollow cross section is arranged the division line forming a helical line $b$. For the sake of simplicity, the division line $b$ as in the drawing, is shown as an inclined straight line and not as a curved helical line. If a pointer $c$ (Fig. 1) is used for reading the scale divisions, a scored line $d$ parallel to the axis of the cylinder is provided, the line $d$ being however not absolutely necessary, if a microscope $m$ (Fig. 3) diagrammatically indicated in the drawing, is used for reading. The microscope is preferably provided with a marker plate, the marker lines of which consist of two engraved lines $m'$ which are parallel to the pitch angle of inclination of the helical line $b$.

Figure 3:
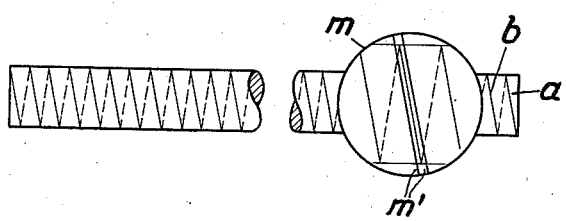

In order to effect a measurement the microscope $m$ is adjusted on the scales so that the lines $m'$ enclose the helical line $b$ (see Fig. 3). The scale can be adjusted relative to the microscope or conversely the microscope can be adjusted relative to the scale. The object to be measured is brought into relationship with the measuring apparatus in any known suitable manner.

Figure 4:
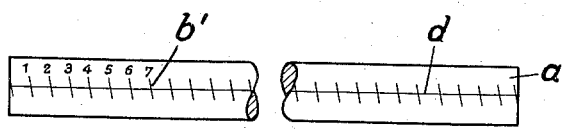

It is unnecessary for the helical line b to extend over the outer periphery of the cylindrical body of the scale in a continuous line and it may, as shown in Fig. 4 be periodically interrupted so as to extend over a part of the periphery of the scale body. The division line will then appear as a row of helical division lines b, lying side by side. In order to produce these lines the engraving tool is periodically raised from the surface of the cylindrical body as, for instance, by the action of a cam. The removal and replacement of the tool in this manner is not effected suddenly, but gradually, so that the tool, as it moves into engagement with the rotary surface, does not undergo any appreciably increased wear.

I claim:

1. A scale member consisting of an elongated cylindrical body of uniform diameter throughout and having a scale line inscribed thereon in a plurality of helical convolutions of constant pitch from end to end of the body, the pitch distance between said convolutions being a definite fraction of the length of said scale member, said scale line being interrupted at definite arcuate portions of the body.

2. In combination, a scale member consisting of an elongated cylindrical body of uniform diameter throughout and having a scale line inscribed thereon in a plurality of helical convolutions of constant pitch from end to end of the body, the pitch distance between said convolutions being a definite fraction of the length of said scale member, and an index having a pair of spaced index lines forming an index space, said lines and space being inclined to extend along said scale line.

HERBERT LINDNER.